United States Patent
Ullah (10) Patent No.: US 9,593,573 B2
(45) Date of Patent: Mar. 14, 2017

(54) FIBER OPTIC SLICKLINE AND TOOLS

(75) Inventor: Kalim Ullah, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 458 days.

(21) Appl. No.: 12/628,355

(22) Filed: Dec. 1, 2009

(65) Prior Publication Data
US 2010/0155059 A1 Jun. 24, 2010

Related U.S. Application Data

(60) Provisional application No. 61/139,658, filed on Dec. 22, 2008.

(51) Int. Cl.
*E21B 23/14* (2006.01)
*E21B 47/12* (2012.01)
*E21B 17/20* (2006.01)
*G02B 6/44* (2006.01)

(52) U.S. Cl.
CPC .......... *E21B 47/123* (2013.01); *E21B 17/206* (2013.01); *G02B 6/443* (2013.01); *G02B 6/4416* (2013.01); *G02B 6/4463* (2013.01)

(58) Field of Classification Search
CPC ........ E21B 47/123; E21B 23/00; E21B 23/14; E21B 47/12
USPC .......... 166/254.2, 250.01; 385/100, 102, 107
See application file for complete search history.

(56) References Cited

U.S. PATENT DOCUMENTS

| | | | |
|---|---|---|---|
| 4,175,230 A | 11/1979 | Richards et al. | |
| 4,190,318 A | 2/1980 | Upton, Jr. | |
| 4,277,134 A | 7/1981 | Upton, Jr. | |
| 4,389,645 A | 6/1983 | Wharton | |
| 4,842,355 A | 6/1989 | Gold et al. | |
| 5,435,395 A | 7/1995 | Connell | |
| 5,493,626 A * | 2/1996 | Schultz et al. | 385/101 |
| 5,588,077 A | 12/1996 | Woodside | |

(Continued)

FOREIGN PATENT DOCUMENTS

| | | |
|---|---|---|
| GB | 2392462 A | 3/2004 |
| GB | 2404994 A | 2/2005 |

(Continued)

OTHER PUBLICATIONS

Combined Search and Examination Report in Great Britain regarding corresponding application No. GB0921314.1; 4 pages; Feb. 5, 2010.

(Continued)

*Primary Examiner* — Kipp Wallace
(74) *Attorney, Agent, or Firm* — Trevor G. Grove (57) ABSTRACT

A fiber optic slickline. The slickline includes fiber optic communication means without full downhole power transmitting capability. Nevertheless, the slickline is configured to accommodate an axial load up to, and in excess of 2,000 lbs. Downhole tools and tool assemblies are configured with opto-electronic interfacing features so as to remain electronically compatible while also taking advantage of fiber optic communications afforded over the slickline. The slickline and tools may be employed in logging and other downhole operations in a manner that provides real time communication with substantially reduced surface equipment expense in terms of footprint and power requirements.

13 Claims, 5 Drawing Sheets

(56) References Cited

U.S. PATENT DOCUMENTS

| | | | |
|---|---|---|---|
| 5,850,879 A * | 12/1998 | Smith | 166/250.01 |
| 5,898,517 A * | 4/1999 | Weis | 356/5.09 |
| 6,072,567 A * | 6/2000 | Sapack | 356/32 |
| 6,353,693 B1 | 3/2002 | Kano et al. | |
| 6,378,627 B1 * | 4/2002 | Tubel et al. | 175/24 |
| 6,520,264 B1 * | 2/2003 | MacKenzie et al. | 166/385 |
| 6,557,249 B1 * | 5/2003 | Pruett et al. | 29/825 |
| 7,140,435 B2 * | 11/2006 | Defretin et al. | 166/255.1 |
| 7,900,699 B2 * | 3/2011 | Ramos et al. | 166/250.01 |
| 7,946,341 B2 * | 5/2011 | Hartog et al. | 166/254.1 |
| 8,903,243 B2 | 12/2014 | Ullah | |
| 2002/0007945 A1 * | 1/2002 | Neuroth et al. | 166/66 |
| 2004/0003921 A1 * | 1/2004 | Schultz et al. | 166/250.01 |
| 2005/0034857 A1 * | 2/2005 | Defretin et al. | 166/250.01 |
| 2005/0236161 A1 * | 10/2005 | Gay et al. | 166/380 |
| 2005/0263281 A1 * | 12/2005 | Lovell et al. | 166/255.1 |
| 2006/0045442 A1 * | 3/2006 | Varkey et al. | 385/102 |
| 2006/0260739 A1 | 11/2006 | Varkey | |
| 2007/0227741 A1 * | 10/2007 | Lovell et al. | 166/380 |
| 2008/0118209 A1 | 5/2008 | Varkey | |
| 2008/0131063 A1 * | 6/2008 | Rubinstein et al. | 385/101 |
| 2008/0181555 A1 * | 7/2008 | Head | 385/13 |
| 2008/0302542 A1 * | 12/2008 | Pessin et al. | 166/386 |
| 2009/0000791 A1 * | 1/2009 | Ice | 166/372 |
| 2009/0194277 A1 * | 8/2009 | Burnett et al. | 166/255.1 |
| 2009/0230295 A1 * | 9/2009 | Waring et al. | 250/260 |
| 2010/0155059 A1 | 6/2010 | Ullah | |
| 2011/0075978 A1 * | 3/2011 | Rose | 385/102 |
| 2012/0213525 A1 | 8/2012 | Ullah | |

FOREIGN PATENT DOCUMENTS

| | | |
|---|---|---|
| GB | 2409871 A | 7/2005 |
| WO | 2004020789 A2 | 3/2001 |
| WO | 2006059157 A1 | 6/2006 |
| WO | 2006059158 A1 | 6/2006 |
| WO | 2006097772 A1 | 9/2006 |
| WO | 2006131871 A2 | 12/2006 |
| WO | 2011035089 A2 | 3/2011 |

OTHER PUBLICATIONS

Examination report regarding corresponding application No. GB0921314.1; 2 pages; Mar. 8, 2011.
Examination report regarding corresponding application No. GB0921314.1; 2 pages; Jul. 26, 2011.
Canadian Examination Report regarding related application No. 2,773,714; 4 pages; Sep. 1, 2016.
International Search Report and Written Opinion regarding related application No. PCT/US2010/049220; 7 pages; Mar. 29, 2011.
International Preliminary Report on Patentability regarding related application No. PCT/US2010/049220; 6 pages; Mar. 29, 2012.
Canadian Examination Report regarding corresponding application No. 2,688,403; 3 pages; Oct. 11, 2016.

* cited by examiner

FIBER OPTIC SLICKLINE AND TOOLS

CROSS REFERENCE TO RELATED APPLICATION

This Patent Document claims priority under 35 U.S.C. §119(e) to U.S. Provisional Application Ser. No. 61/139,658, entitled Optical Slickline Downhole Tool for Oilfield Applications, filed on Dec. 22, 2008, which is incorporated herein by reference in its entirety.

FIELD

Embodiments described relate to optical slickline tools and applications run in wells. The applications may include logging and other applications run over a slickline with real-time data acquisition and/or communication made possible by way of an internal fiber optic line of the slickline.

BACKGROUND

In recognition of the significant expenses associated with hydrocarbon wells, added emphasis has been placed on well logging, profiling and monitoring of conditions throughout the life of a well. As a result, the detecting and monitoring of well conditions over the years has become a more sophisticated and critical part of managing well operations.

Initial gathering of information relative to well and surrounding formation conditions may be obtained by way of a logging application. That is, equipment at the surface of an oilfield adjacent to the well may be used to deploy a logging tool in the well. Often, an electrically conductive logging cable is used to deliver the logging tool into the well. The logging cable may include a variety of power and communicative lines incorporated into the cable along with a host of isolating and protective polymer layers. As a result, the cable may be of relatively substantial weight, strength, and profile. Thus, the cable may be well suited for delivery of the logging tool to significant well depths without undue concern over the accommodated load of the tool or perhaps the increasing load of the cable itself.

While well suited to accommodate a significant amount of load, the use of such cables as described above means that the equipment positioned at the surface of the oilfield may be fairly substantial in terms of footprint and power requirements therefor. Similarly, the set up and performance cost of running the operation may also be quite significant.

Due to the costs involved, a cabled logging application as described above is often bypassed in favor of a more cost effective "slickline" logging application. That is, rather than employing an electrically powered and/or electrically communicative cable as in the case of a cabled application, a comparatively lower profile line without such capacity may be employed in a conventional slickline application. The slickline is a relatively unitary line used to deliver the logging tool which includes no electrically conductive wiring. Thus, a downhole battery is provided and data obtained from the logging application may be processed after retrieval of the logging tool. Notably, however, due to the substantially lower profile and comparatively lower weight of the slickline, considerable expense may be saved. For example, expenses may be affected in terms of reduced surface equipment requirements, as well as reductions in expenses associated with set up, powering, and footprint requirements.

Unfortunately, while slickline reduces operational expenses, the lack of communicative capacity eliminates the possibility of acquiring any real-time logging information. As noted above, logging data acquired via conventional slickline applications is processed only after the logging tool is brought out from the well. Depending on the depth of the well, this manner of logging retrieval and processing is likely to take up several hours of operational time at a minimum. Once more, there is no manner by which to communicate any malfunction of the logging tool or downhole battery during the operation. Thus, in cases where malfunction does occur, the entire operation may need to be re-run. Additionally, without the availability of real-time information, the possibility of any real-time downhole intervention in conjunction with a slickline logging operation is rendered useless or impractical.

Ultimately, in spite of the additional expense involved, logging applications are often run on wireline due to the unavailability of real-time downhole communication where slickline is employed. Indeed, even in circumstances such as shallow wells where the added load carrying capacity of wireline is of no particular benefit, the substantially more expensive wireline operation is often employed nonetheless due to the downhole communicative capacity provided.

SUMMARY

A fiber optic slickline is provided with an internal fiber optic line. The line is surrounded by an outer protective jacket which, together with the line, form a slickline of substantially unitary construction. This slickline of unitary construction is configured to accommodate the axial load of a downhole tool coupled thereto.

DETAILED DESCRIPTION

Embodiments are described with reference to certain tools and applications run in a well over slickline. As used herein, the term "slickline" is meant to refer to an application that is run over a non-powered or non-electrical line. That is, as opposed to a high profile cable incorporating varying electrically conductive lines, downhole applications detailed herein are run over a relatively cohesive or solid state low profile slickline. Additionally, the embodiments detailed herein are described with reference to particular logging applications and tools. However, a variety of alternative logging tool configurations may be employed as well as a host of alternative types of downhole tools and applications. Regardless, embodiments described herein may employ a fiber optic slickline that is of a unitary configuration. That is to say, the slickline includes a fiber optic line and protective outer tube which together cohesively and substantially exclusively accommodate the axial load of an associated downhole tool.

Figure 1:
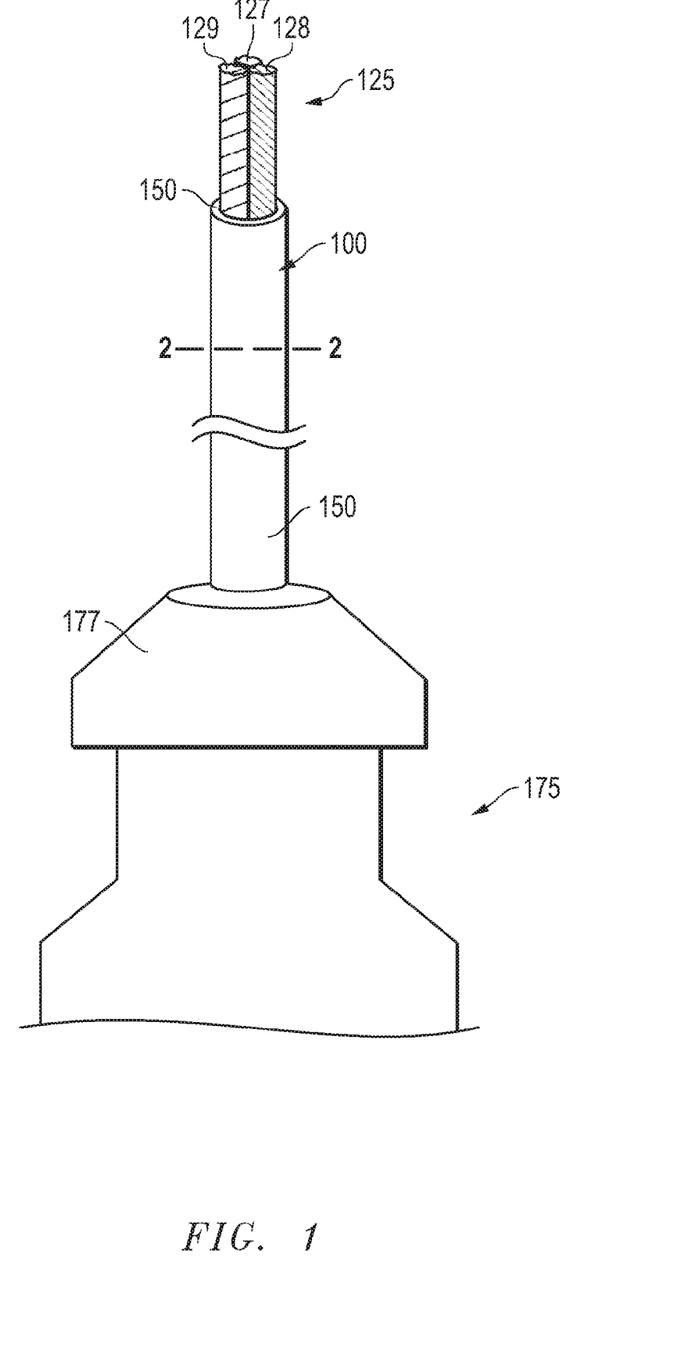
FIG. 1 is a side partially sectional view of an embodiment of a fiber optic slickline downhole tool assembly, viewed from its logging head.

Referring now to FIG. 1, a partially sectional side view of an embodiment of a fiber optic slickline and downhole tool assembly is depicted. Specifically, fiber optic slickline 100 is shown anchored or secured to a coupling 177 of a logging head 175. The logging head 175 accommodates a larger downhole logging assembly 300 visible in FIG. 3. Regardless, the slickline 100 is configured to support a substantially axial load of more than about 2,000 lbs. without the requirement of any additional surrounding supportive structure. For example, in the embodiment shown, the slickline 100 is made up of a an internal fiber optic line 125 surrounded by an outer protective jacket 150. In the embodiment shown, some degree of spacing 200 may be present between individual fibers 127, 128, 129 of the line 125 and the outer protective jacket 150 (see FIG. 2A). However, in other embodiments, a suitable filler material may be provided in the spacing 200.

Continuing with reference to FIG. 1, with the exception of the internal non-powered communicative line 125 and its surrounding outer protective jacket 150, no other support structure is provided from which the logging head 175 may be secured. Rather, substantially the entire load of the head 175 and remainder of the downhole assembly is supported directly by an internal fiber optic line 125 and surrounding outer protective jacket 150. As detailed below, this may result in a load bearing capacity somewhat below that of a larger cable 210 (see FIG. 2B). However, substantial reliance on the load bearing capacity of the fiber optic line 125 itself results in a conveyance line of significantly reduced profile and weight. Therefore, as also detailed further below, expenses associated with footprint and power requirements at the oilfield surface 301 may be substantially reduced without foregoing downhole communications as in the case of more conventional slickline configurations (see FIG. 3).

The fiber optic line 125 of FIG. 1 may be single or multi-mode. In the embodiment shown, the line 125 includes a bundle of separate optical fibers 127, 128, 129. So, for example, dedicated downhole transmission 127, uphole transmission 128, and temperature sensor 129 fibers may be provided. Additionally, these fibers 127, 128, 129 may be tightly packed adjacently to one another so as to enhance the load bearing capacity of the line 125. However, as detailed further below, the dedicated temperature sensing fiber 129 may run the length of the fiber optic slickline 100 without structurally coupling to the logging head 175 or other downhole tools. That is, apart from accommodating any substantial degree of axial load, the optical temperature fiber 129 may be configured primarily to provide independent distributed temperature sensing over the length of the slickline 100 (often provided as part of a separate non-logging mode application).

In contrast to the depicted embodiment, temperature sensing may be achieved through non-fiber optic means in other embodiments. Furthermore, a single optical fiber may be employed for two-way downhole communications. For example, in one embodiment, light signal may be sent downhole at a given wavelength toward the assembly over a single optical fiber, whereas return signal may be transmitted back uphole over the same fiber via a different wavelength. Thus, the fiber optic slickline 100 may include only a single optical fiber coupled to uphole and downhole splitters for proper route channelizing of communications.

Figure 2A:
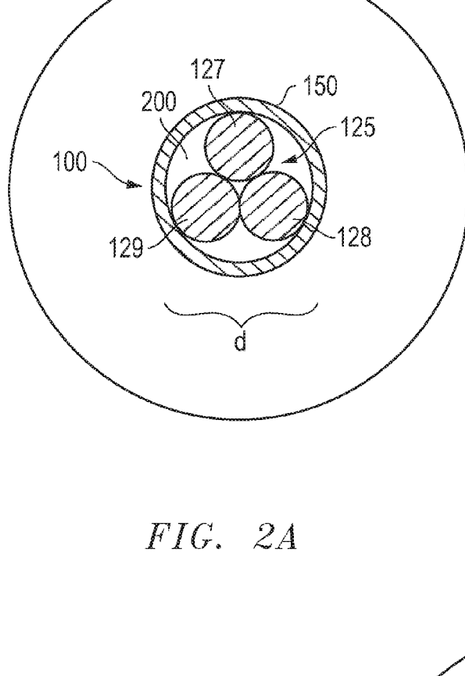
FIG. 2A is an enlarged cross-sectional view of the fiber optic slickline of the assembly of FIG. 1 taken from 2-2 thereof.

Referring now to FIG. 2A, an enlarged cross-sectional view of the fiber optic slickline 100 is depicted taken from 2-2 of FIG. 1. In this view, the outer diameter d of the slickline 100 is apparent. In the embodiment shown, this diameter d may be between about 0.1 inches and about 0.25 inches, more preferably between about 0.125 inches and about 0.15 inches. Regardless, as described below, the diameter d is comparable to that of conventional non-communicative slickline and of a substantially lower profile than that of a conventional wireline cable 210 (see FIG. 2B). Furthermore, unlike the electrical cable 210 described below, the slickline 100 is fiber optic in nature. Thus, in terms of data transfer, substantially higher speeds and greater bandwidths may be provided with a lower degree of noise (i.e. due to avoidance of electromagnetic interference). Additionally, problems associated with power loss over the length of the slickline 100 are of substantially negligible concern.

Continuing with reference to FIG. 2A, the individual fibers 127, 128, 129 of the fiber optic line 125 are shown. These fibers 127, 128, 129 may be closely packed and encased by the depicted outer protective jacket 150. In the embodiment shown, the outer protective jacket 150 may be of stainless steel or other high yield strength metal so as to provide a degree of robustness and corrosion resistance to the slickline 100 suitable for use in a downhole environment. In one embodiment, the outer protective jacket 150 is made up of two separate corrosion resistant metal layers. These layers may be concentrically separated by an annulus filled with a composite of polymeric tie and/or strength material. As such, the internal features of the slickline 100 may remain protected from exposure to any downhole fluid which happens to penetrate the outermost metal layer of the outer protective jacket 150. In such circumstances, the penetrating downhole fluid may become trapped within the polymeric composite layer.

As also indicated above, the outer protective jacket 150 along with the fiber optic line 125 may be primarily responsible for accommodating the load of the downhole assembly (i.e. without any additional support line). In one embodiment, this load may be in excess of about 2,000 lbs. where the slickline 100 is between about 0.1 and about 0.25 inches in diameter d as detailed above.

Figure 2B:
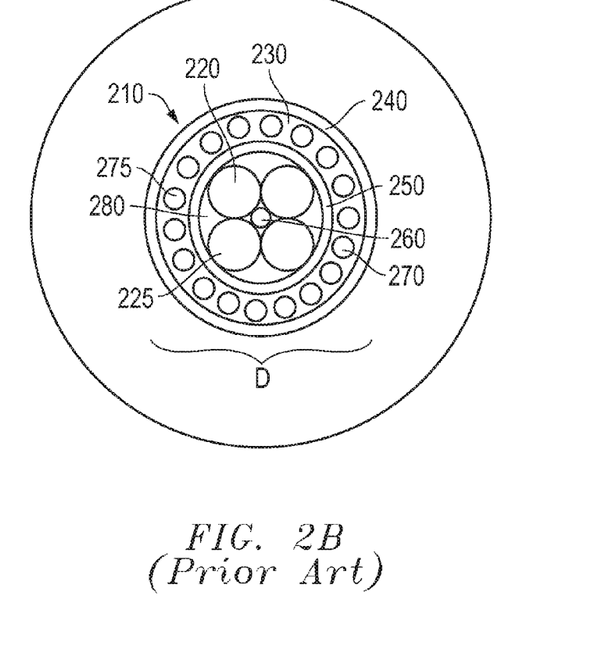
FIG. 2B is an enlarged cross-sectional view of a typical prior art wireline cable for a downhole tool assembly.

Referring now to 2B, with added reference to FIG. 2A, an enlarged cross-sectional view of a prior art cable 210 is depicted for use with a downhole tool assembly. Like the fiber optic slickline 100 of FIG. 2A, the cable 210 is equipped with communicative capacity. However, in sharp contrast to the embodiment of FIG. 2A, the cable 210 of FIG. 2B is also equipped with electrically conductive wiring 220, 225. This wiring 220, 225 may be provided for powering of downhole tools secured to the cable 210, for communications with downhole tools, or both. In the particular example shown, a reinforcement member 260 may also be provided surrounded by the larger surrounding electrically conductive wiring 220, 225.

Furthermore, as with most conventional cables, the cable 210 of FIG. 2B is provided with several structural layers. For example, the electrically conductive wiring 220, 225 is surrounded by an inner insulating jacket 250 along with polymeric filler material 280. Additionally, given loads in excess of about 10,000 lbs. that may be accommodated by the cable 210, an additional layer of armor or strength member wiring 275 may be provided. Again, this wiring 275 may be immersed in additional filler material 230 and the entire cable 210 encased by an outer jacket 240 configured in light of the load capacity of the cable 210 and the downhole environment.

All in all, the cable 210 of FIG. 2B makes for a comparatively heavier mode of delivery, per foot, as compared to the fiber optic slickline 100 of FIG. 2A. Further, it is unlikely that a conventional cable such as the cable 210 of FIG. 2B would be less than about 0.25 inches in diameter D. Together with the added weight, these factors would have a dramatically adverse effect on the cost of downhole deployment as compared to use of a fiber optic slickline 100, as detailed further herein.

Figure 3:
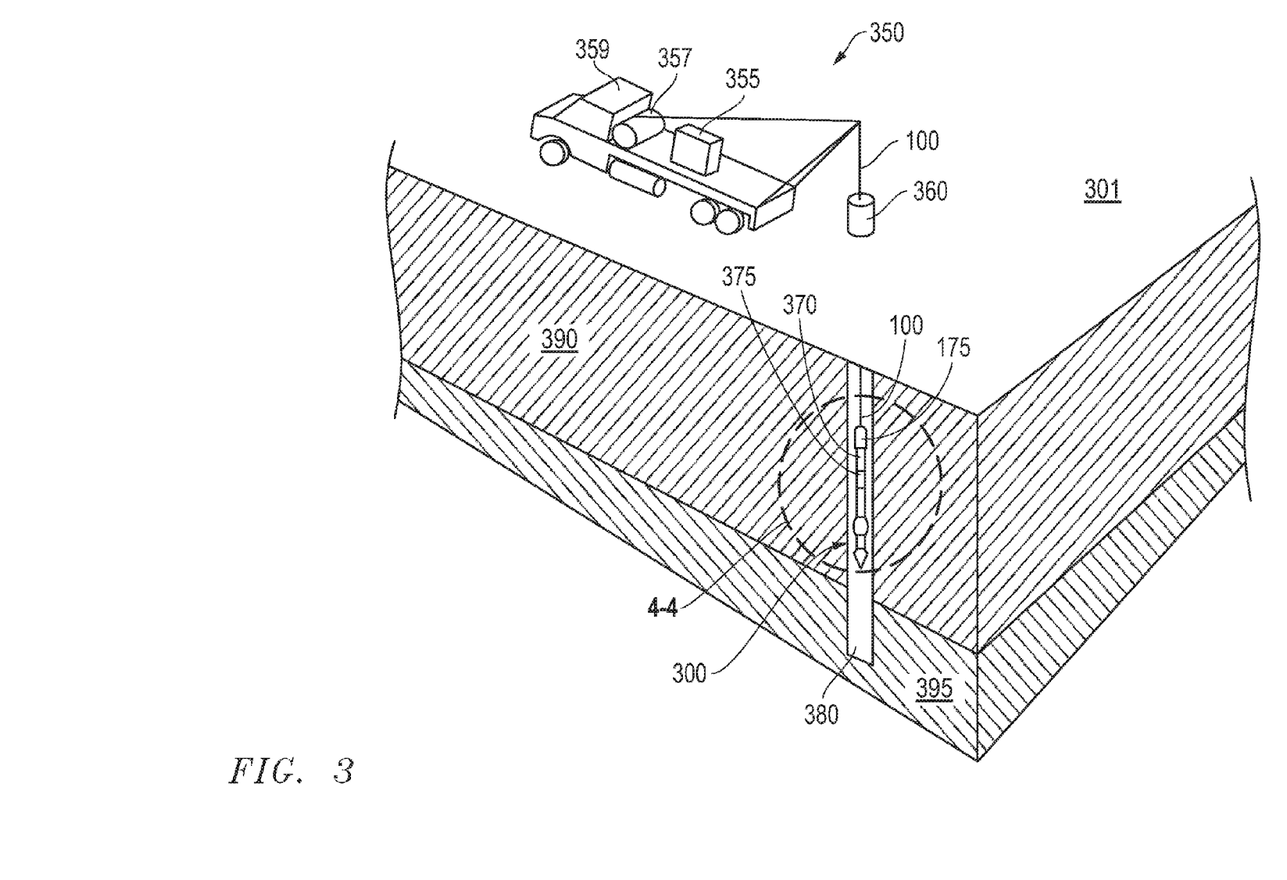
FIG. 3 is an overview of an oilfield with a well accommodating the fiber optic slickline assembly of FIG. 1 therein.

Referring now to FIG. 3, an overview of an oilfield 301 is depicted with a well 380 accommodating the fiber optic slickline 100 of FIG. 1 therein. As shown, the fiber optic slickline 100 is employed for delivery of a logging tool 300 to the well 380. More specifically, the fiber optic slickline 100 is directly coupled or anchored to the logging head 175 (as also depicted in FIG. 1). The logging head 175 is in turn coupled to the noted logging tool 300 via an opto-electric interface 370 and lithium battery 375, detailed further with respect to FIG. 4 below. Thus, a communicative slickline logging application may proceed with downhole power requirements provided via a downhole battery 375. As a result, surface equipment, footprint, and power requirements may be dramatically reduced without foregoing real-time communications.

The alluded to surface equipment 350 may consist of a conventional slickline delivery truck 359 which accommodates a winch driven drum 357 and data acquisition or control unit 355. The winch driven drum 357 in particular is substantially smaller in size and power requirements as compared to winch and drum equipment required for delivery of a wireline cable 210 such as that of FIG. 2B. Nevertheless, the drum 357 and conventional powering therefor, may adequately accommodate and deploy a load of more than about 2,000 lbs. The control unit 355 may be employed to direct this deployment of the fiber optic slickline 100 through a well head 360 leading to the well 380. Additionally, the control unit 355 may direct the logging application in an ongoing manner as the logging tool 300 proceeds through the well 380 traversing various formation layers 390, 395.

As detailed above, the fiber-optic slickline 100 allows for real-time communications. Thus, the logging data may be acquired and processed by the control unit 355 as the logging application depicted in FIG. 3 proceeds. Once more, in certain embodiments, adjustments to the logging application may be directed by the control unit 355 in real-time based on the acquired logging data. For example, logging of a particular section of the well 380 may be repeated based on the data obtained therefrom.

In order to process optical data retrieved during the logging application, the control unit 355 may be equipped with a surface opto-electric interface so as to convert the optical data to electronic data for processing. Such opto-electric interfacing is detailed further below with respect to FIG. 4, where the downhole opto-electric interface 370 serves as a transreceiver for two way communications. Additionally, a line tension meter which interfaces the fiber optic slickline 100 during operations may be coupled to the control unit 355. In this manner, tension data relative to the slickline 100 may be fed to the control unit 355 during operations. Thus, any necessary adjustments to the application, for example, in terms of retrieval rate, may be made in real-time, thereby minimizing the possibility of damage to the slickline.

As described above, a passive or non-interventional logging application is depicted in FIG. 3. However, a variety of other operations may take advantage of embodiments of fiber optic slickline 100 as detailed herein. For example, the tool assembly may be equipped with a casing collar locator, pressure, temperature, and other sensors. Furthermore, more active or interventional applications such as perforating, jarring, and shifting of well casing sleeves may take proceed over fiber optic slickline 100. Additionally, packer/plug positioning (i.e. setting and retrieval) may take place over embodiments of fiber optic slickline 100 as described herein. Furthermore, an assembly may be provided in which a passive application such as logging may be employed in conjunction with an interventional application such as perforating or sleeve shifting. For example, with a communicative slickline 100 available, a logging application may proceed with logging information processed in real time immediately followed by an interventional perforation based on the processed information. That is, without ever removing the slickline 100 and associated tools from the well 380, logging may be immediately followed by real-time perforating where appropriate.

Figure 4:
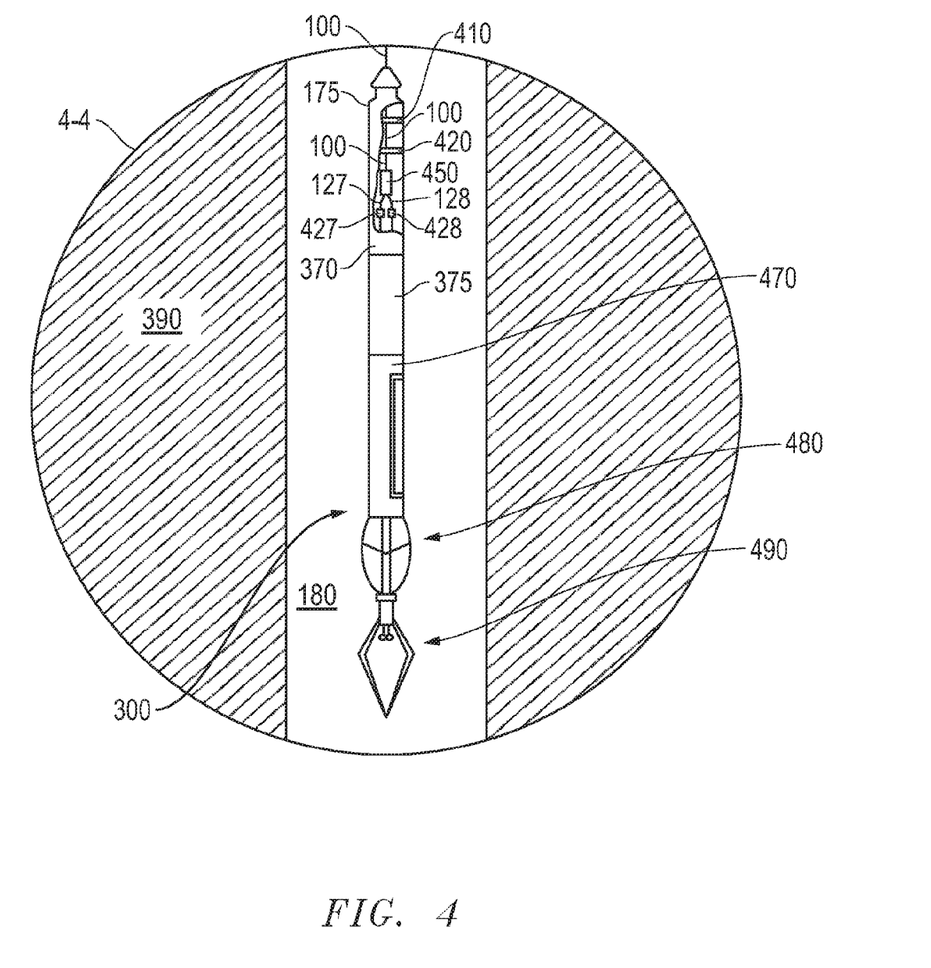
FIG. 4 is an enlarged sectional view of the fiber optic slickline assembly of FIG. 3 taken from 4-4 thereof.

Referring now to FIG. 4, an enlarged sectional view of the well 380 is depicted taken from 4-4 of FIG. 3. In this view, the fiber optic slickline 100 is shown supporting the logging tool 300 by way of a logging head 175, opto-electric interface 370 and battery 375 as noted above. With no power supply from surface, the battery 375 may be a conventional lithium power source sufficient for substantially meeting any downhole power requirements of logging 300 and any other downhole tools. Indeed, as described below, the logging tool 300 may be fairly sophisticated.

In the embodiment shown, the logging tool 300 is a 1-2 inch diameter piece of equipment outfitted with a host of well profile generating implements. These implements may be configured for logging directed at acquiring information on well fluids and formation measurements from which an overall well profile may be developed. The noted equipment includes a sonde 470 equipped to acquire basic measurements such as pressure, temperature, casing collar location, density acquisition and others. A gas monitoring implement 480 may also be incorporated into the tool 300. Additionally, a caliper and flow imaging implement 490 may be provided which, in addition to imaging, may be employed to acquire data relative to tool velocity, water, gas, and other well characteristics.

The logging information obtained from the above detailed logging tool 300 may be electronic in nature. Therefore, in order to send the logging data uphole over the fiber optic slickline 100, the above noted opto-electric interface 370 is provided. Similarly, the opto-electric interface 370 allows for the transfer of surface generated optical information to the logging 300 or any other tools. The interface 370 includes a light source 428 such as a conventional LED or laser diode. The source 428 is responsive to electronic signaling from the logging tool 300, which is routed through an opto-electronic board of the interface 370. Thus, electronic signaling is ultimately converted into optical data for transmission over the uphole transmission fiber 128. Similarly, the interface 370 receives the downhole transmission fiber 127 at a downhole receiver 427 which converts optical data to electronic data compatible with the logging 300 or any other downhole tool.

Of note is the fact that the interface 370 is equipped with different internal seals 410, 420, 450. More specifically, logging head seals 410, 420 are provided within the logging head 175 so as to protect downhole equipment from any downhole fluid that may penetrate the logging head 175. These seals 410, 420 interface the slickline 100 at the outer protective jacket 150 (see FIG. 1). Thus, any fluid which penetrates the coupling 177 near entry of the slickline 100 is prevented from passing beyond the logging head seals 410, 420, particularly given the double seal nature of the configuration (see FIG. 1).

An optical feed through seal 450 is also provided within the housing of the opto-electric interface 370. It is at this location of the seal 450 that optical fibers 127, 128 are spread apart from the slickline 100 thereabove. Thus, any downhole fluid that has penetrated the slickline 100 at a location above the logging head 175 is prevented from travelling internally along the slickline beyond the feed through seal 450. The seal 450 may include bare glass of the fibers 127, 128 sealed within a metal cavity of high pressure and temperature resistance. As such, even where the slickline 100 is accidentally broken downhole, fluid is prevented from traversing the seal 450 by way of internal access to the slickline 100.

All in all, the above noted seals 410, 420, 450 provide adequate protection from downhole fluid exposure to sophisticated and/or higher cost downhole component and sensor equipment such as components of the logging tool 300. The seals 410, 420, 450 may be configured to withstand the rigors of the downhole environment. For example, they may be rated to withstand a differential pressure of more than about 15,000 psi and temperatures in excess of about 175° C.

Figure 5:
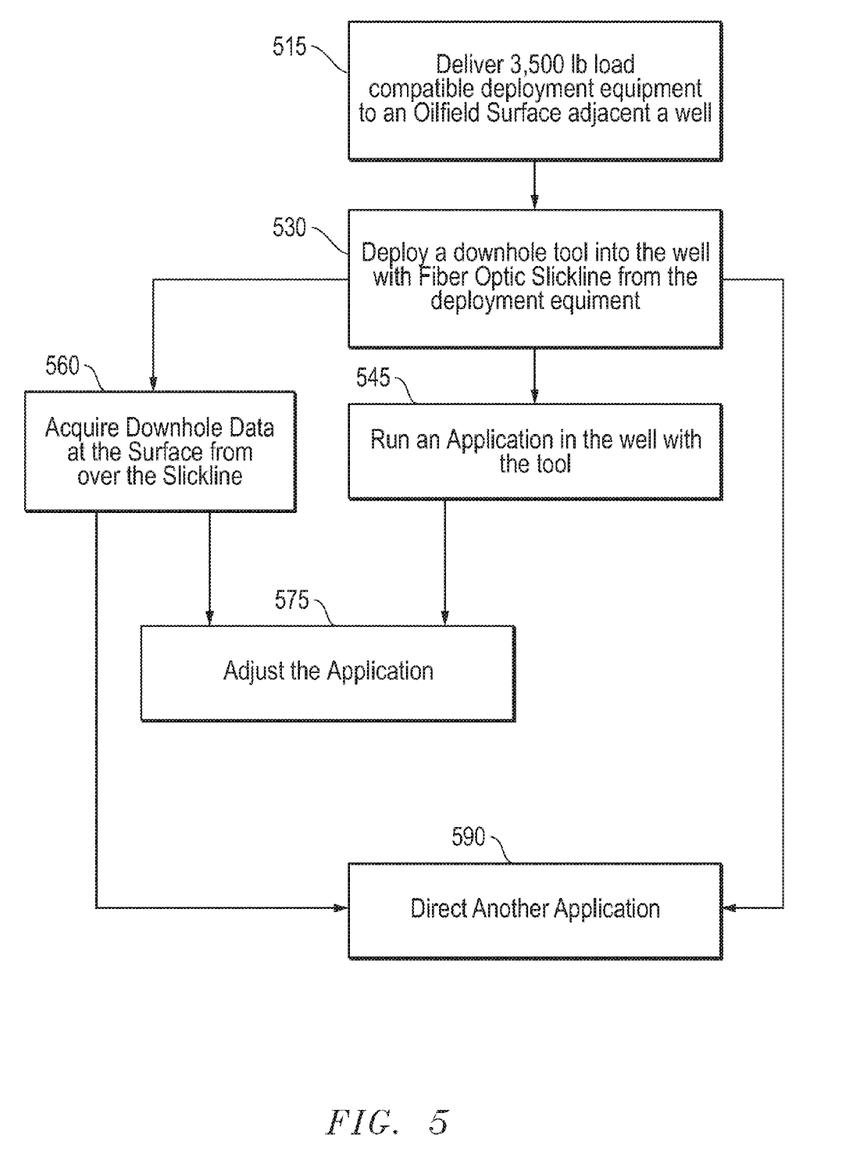
FIG. 5 is a flow-chart summarizing an embodiment of employing a fiber optic slickline and downhole tool assembly.

Referring now to FIG. 5, a flow-chart summarizing an embodiment of employing a fiber optic slickline is shown. As indicated at 515, surface equipment may be delivered to the well site at the oilfield that is compatible for deployment of up to about a 2,000 lb. load. Thus, as described hereinabove, footprint, powering and overall expenses associated with the surface equipment may be dramatically reduced as compared to substantially larger load equipment setups such as for wireline cable applications.

As alluded to above and indicated at 530, the downhole tool assembly may be deployed into the well via a fiber optic slickline from the surface deployment equipment. As a result, applications with the tool may proceed as indicated at 545 in a manner that allows for real time acquisition of downhole data to occur at the surface (see 560). Thus, as indicated above, footprint and other expenses associated with surface equipment may be reduced without the loss of communications.

Indeed, with real-time communications available, the parameters of the downhole application may be adjusted in real-time as indicated at 575. For example, as a logging application proceeds with a downhole logging tool, data acquired therefrom may be processed at the surface and real-time adjustments made to the logging application based on the processed data.

As indicated at 590, the availability of real-time two-way communication over the slickline allows for more than adjustment to the initial downhole application. That is, implementation of additional downhole applications may take place over the slickline (e.g. beyond an initial logging application). Such additional applications may even proceed based on information acquired from the initial downhole application. So, for example, a perforation application may be directed over the slickline based on processed information acquired from an initial logging application. With adequate downhole power already in place, the subsequent perforation application may proceed with the slickline remaining in place downhole, perhaps even optically detonating perforations.

Embodiments of fiber optic slickline and associated tool assemblies described herein are provided in a manner that reduces operation expenses as compared to conventional wireline operations. Additionally, unlike traditional slickline operations, slickline embodiments described herein allow for real-time acquisition of downhole information such as logging data. Thus, not only may operational adjustments be made in real-time, but downhole operations need not proceed blindly. As a result, the possibility of running an application in the well, only to later find out that the downhole power was out, is eliminated. All in all, embodiments of slickline, tools, and techniques detailed herein may provide dramatic cost reductions as compared to conventional slickline and/or wireline operations.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, in certain embodiments, the slickline may be of particular hydrogen and temperature resistance for use in certain downhole environments. Additionally, portions of the fiber optic slickline may accommodate electrical transmissions in addition to optical signaling. In still other embodiments, the temperature fiber may be employed with the deployed line in stationary mode for conventional DTS measurements with subsequent dynamic logging and data transmission over adjacent fibers. Regardless, the foregoing description should not be read as pertaining only to the precise structures described and shown in the accompanying drawings, but rather should be read as consistent with and as support for the following claims, which are to have their fullest and fairest scope.

I claim:

1. An assembly for downhole use in a well at an oilfield, the assembly comprising:

equipment at a surface of the oilfield comprising a data acquisition unit and a line tension meter, the line tension meter coupled to the data acquisition unit;

a non-power transferring fiber optic slickline, wherein the non-power transferring fiber optic slickline comprises at least one fiber encased in an outer protective jacket, wherein the outer protective jacket comprises two separate corrosion resistant metal layers, wherein the corrosion resistant metal layers are concentrically separated by an annulus, and wherein the annulus is filled with a composite of polymeric tie material, strength material, or combinations thereof; and an opto-electric interface comprising a logging head connected with the non-power transferring fiber optic slickline, wherein two seals that interface with the outer protective jacket of the non-power transferring fiber optic slickline are located in the logging head, wherein the opto-electric interface further comprises an optical feed through seal in which optical fibers are separated from the slickline, and wherein the optical feed through seal comprises glass fibers sealed within a metal cavity; and a downhole tool coupled to the opto-electric interface for disposal in the well and configured to perform a downhole application by gathering downhole data and for communicating, in real-time, between the data acquisition unit and the downhole tool over said optical slickline, the downhole tool comprising a battery for powering the tool, wherein the data acquisition unit is configured to direct the surface equipment and thereby direct deployment of the downhole tool into the well and out of the well, and to adjust the operation of the downhole tool, and
to adjust the downhole application, initiate an additional downhole application in real-time without removing the down hole tool from the well, or to control the deployment of the downhole tool into the well and out of the well based on
data acquired from the downhole tool or based on slickline tension data from the tension meter, or based on data acquired from the downhole tool and based on slickline tension data from the tension meter.

2. The assembly of claim 1 wherein said downhole tool is a logging tool.

3. The assembly of claim 1 wherein said downhole opto-electric interface comprises:
    an opto-electronic board to obtain electronic data from said downhole tool; and
    a light source coupled to said board and said fiber to transmit optical data thereover.

4. The assembly of claim 3 wherein said downhole opto-electric interface comprises an optical receiver coupled to said fiber to convert optical data therefrom to electronic data for directing said downhole tool.

5. The assembly of claim 1 wherein said data acquisition unit is electronically compatible, said slickline coupled thereto via a surface opto-electronic interface to support the communicating.

6. The assembly of claim 1 wherein said unit serves as a control unit for directing an application with said tool.

7. The assembly of claim 1 configured to support an axial load of at least about 900 kg (2,000 lbs).

8. The assembly of claim 1, wherein an outer diameter of the fiber optic slickline is between about 2.5 mm and about 6.3 mm (about 0.10 inches and about 0.25 inches).

9. The assembly of claim 1 wherein said fiber optic line comprises a single optical fiber for two way communications over multiple wavelengths.

10. The assembly of claim 1 wherein said fiber optic line comprises:
    a dedicated uphole transmission fiber; and
    a dedicated downhole transmission fiber.

11. The assembly of claim 10 wherein said fiber optic line further comprises a temperature sensor fiber, said uphole transmission, downhole transmission, and temperature sensor fibers are adjacently packed together.

12. The assembly of claim 11 wherein said temperature sensor fiber is configured to acquire temperature profile data of the well with the slickline in a stationary mode and said transmission fibers are configured to transmit logging information with the slickline in a dynamic mode.

13. The assembly of claim 11 wherein said fiber optic slickline is configured to provide distributed temperature sensing over the length of the fiber optic slickline.

\* \* \* \* \*